Oct. 21, 1969 S. MARKOWITZ ET AL 3,474,419

WORD DRIVE SYSTEM FOR A MAGNETIC CORE MEMORY

Filed June 8, 1964

INVENTORS
SEYMOUR MARKOWITZ
DAVID W. MAYNE
BY Samuel Lindenberg
Arthur Friedrich
ATTORNEYS

United States Patent Office 3,474,419
Patented Oct. 21, 1969

3,474,419

WORD DRIVE SYSTEM FOR A MAGNETIC CORE MEMORY

Seymour Markowitz, Los Angeles, and David W. Mayne, Woodland Hills, Calif., assignors to Ampex Corporation, Culver City, Calif., a corporation of California Filed June 8, 1964, Ser. No. 373,411
Int. Cl. G11b *5/44*
U.S. Cl. 340—174 7 Claims

ABSTRACT OF THE DISCLOSURE

Word drive system for a word organized magnetic core memory with a charge storage diode connected in series with each of the memory word lines. A read current path is provided which includes a read sink switch which is connected to the charge storage diode anode ends of the word line and a read current source connected to the charge storage diode cathode end of the word lines. A write current path includes a write sink switch connected to the cathode end of the word lines and a write current source connected to the anode end of the word lines. High impedance biasing resistors may be connected across the word lines to normally back-bias the charge storage diodes.

Figures 1A, 1B, 1C:
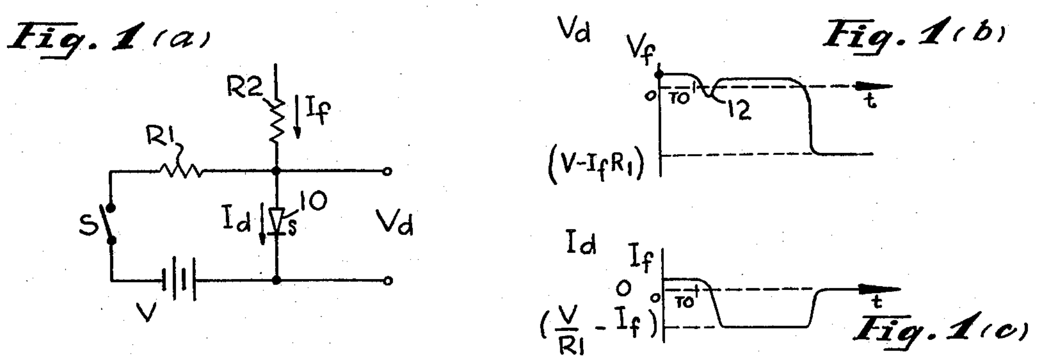

This invention relates generally to digital memory apparatus and more particularly to an improved word drive system for a word organized memory.

Digital memories employing discrete memory elements and suitable for use in data processing equipment are usually either of the word organized type or the coincident current type. In the coincident current type of memory, a plurality of memory planes are usually provided, each plane including a matrix of memory elements, for example, magnetic cores. Each plane is made up of all cores storing a corresponding bit in each of the memory locations. Row and column selection windings respectively extend horizontally and vertically through each plane and a particular core in each plane is selected by driving currents through the selection windings intersecting that core. The greater magnetic field produced at the intersection of the two conducting selection windings uniquely identifies the selected core.

In a word organized type of memory, all cores storing bits in the same word are coupled to a common selection or word line winding which is not coupled to cores in any other word. Therefore, selection can be accomplished utilizing one winding rather than two intersecting windings. Actually, most known word organized memories usually employ two word lines per word for respectively carrying reading and writing currents in opposite directions.

More particularly, in a typical state-of-the-art word organized magnetic core memory, read and write current pulses are diverted into a particular word line on the basis of identifying information stored in a memory address register. End fire drive is often used whereby activation of one of M switches and one of N drivers causes a current to be diverted through one of MN word lines, i.e. the one which interconnects the selected switch and the selected driver. Each of the MN word lines usually has a diode in series to prevent currents from leaking through unselected word lines. The presence of the diodes precludes the word lines from conducting both read and write current pulses. Therefore, each memory location usually must have a read word line and a write word line, each with its series diode. MN read word lines form a first matrix interconnecting M read switches and N read drivers. MN write word lines form a second matrix connecting M write switches and N write drivers.

A word organized memory drive system is disclosed by A. Melmed and R. Shevlin in a paper entitled "Diode Steered Magnetic Core Memory," IRE PGEC Transactions, December 1959, which employs only one word line per word, each such line having a charge storage diode connected in series therewith. A charge storage diode permits current to be conducted in a reverse direction therethrough for a finite time period after the termination of a current conducted in the forward direction. Thus, a read current pulse is caused to flow in the forward direction through the selected diode which subsequently permits current flow in the reverse direction when a reverse voltage is applied to all the diodes. This reverse current comprises the write current. The write current can exist until all the minority carriers stored during the forward pulse period are recombined. In the word drive system disclosed in the cited paper, resistors to direct current potential sources determine the write current and hold unselected diodes back-biased. A switch and a driver are turned on ("endfire") during read time. Resistor current subtracts from the driver current to determine the read current. As should be apparent, a memory arrangement of this type has certain inherent disadvantages amongst which are poor control of the read current inasmuch as this current represents the difference between two large currents, i.e. the driver current and resistor current. In addition, a large amount of power is dissipated and the read drivers and switches must be capable of handling large currents. Other disadvantageous features of the disclosed system include relatively slow operation due to large voltage swings which also raise the danger of component breakdown.

The present invention is directed to a word drive system for a word organized memory which obviates many of the disadvantages of known prior art systems.

In accordance with the present invention, a charge storage diode is connected in series with each of the memory word lines. A read current path is provided which includes read sink switches connected to the charge storage diode anode ends of the word lines and a read current source connected to the charge storage diode cathode end of the word lines. A write current path includes a write sink switch connected to the cathode end of the word lines and a write current source connected to the anode end of the word lines. High impedance biasing resistors are connected across the word lines to normally back-bias the charge storage diodes. Because of the high impedance of these biasing resistors, they divert substantially no current from either the read or write currents which can thereby entirely flow through a selected memory word line.

Figure 2:
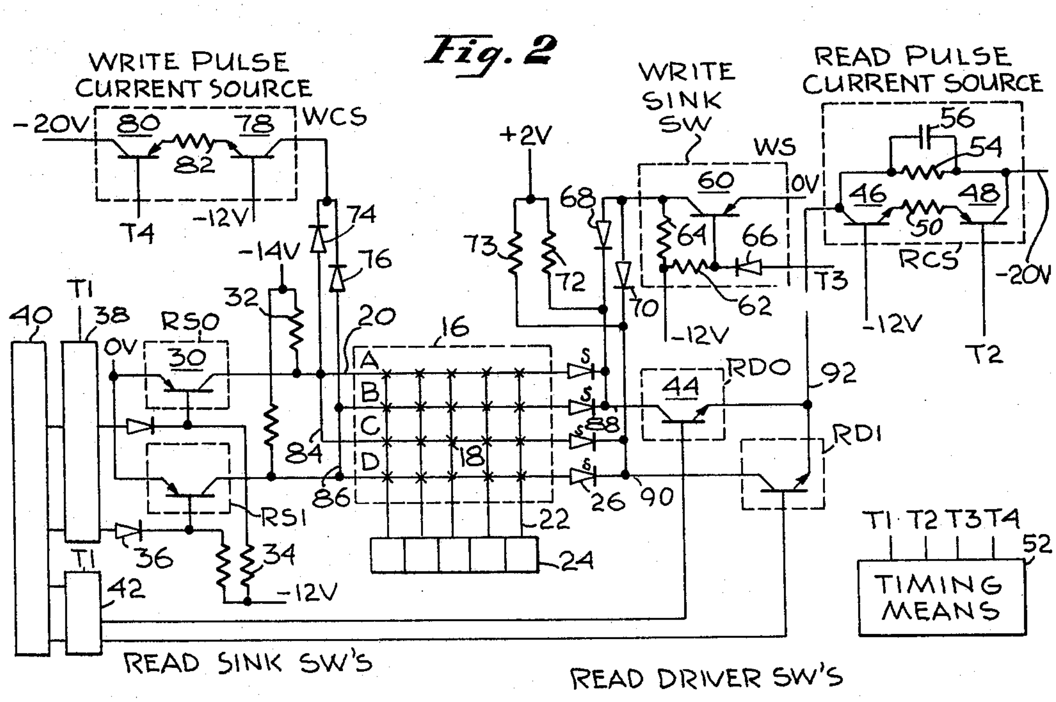
Figures 3A, 3B, 3C, 3D, 3E:
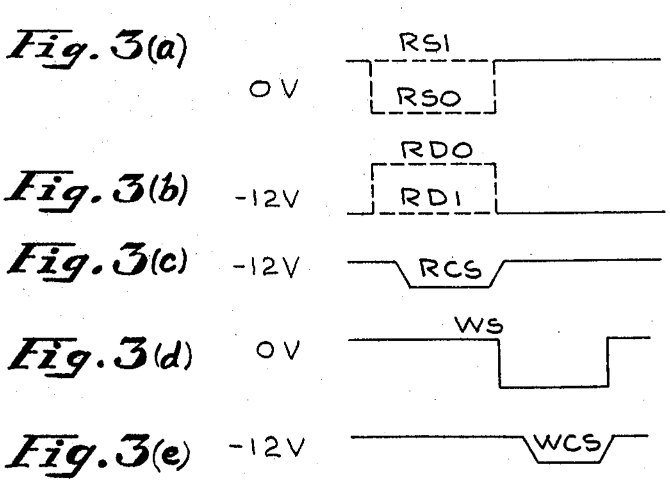

The novel features that are considered characteristic of this invention are set forth with particularity in the appended claims. The invention itself both as to its organization and method of operation, as well as additional objects and advantages thereof, will best be understood from the following description when read in connection with the accompanying drawings, in which:

FIGURE 1(*a*) is a diagram of an exemplary circuit employing a charge storage diode;

FIGURES 1(*b*) and 1(*c*) are waveform diagrams respectively illustrating the voltage across and the current through the charge storage diode of FIGURE 1(*a*) during an interval in which a reverse potential is applied across the diode after a forward current has been conducted therethrough;

FIGURE 2 is a schematic diagram of a word organized memory system including a word drive system constructed in accordance with the teachings of the present invention; and FIGURES 3(*a*) through 3(*e*) are waveform diagrams illustrating the relationship between various signals utilized in the operation of the memory system of FIGURE 2.

Most conventional semi-conductor diodes can be made to conduct heavily in the reverse direction for some period of time immediately following forward conduction. This augmented reverse conductivity results from the presence of residual minority carriers which are injected and stored during forward conduction. Reverse storage conduction is detrimental in many applications and a class of diodes often referred to as "fast recovery" diodes has accordingly been developed which are characterized by a short storage conduction period. Another class of diodes often referred to as "step recovery" or "charge storage" diodes have been developed whose operation is characterized by a very abrupt transition from reverse storage conduction to cut off. During reverse recovery, the conductivity versus time dependence of these diodes closely approximates a step function.

FIGURE 1(*a*) illustrates a simple circuit which includes a charge storage diode 10 connected in a series loop including a resistor R1, a switch S, and a source of reverse potential V. The behavior of the diode 10 can be observed by initially directing a current $I_f$ through resistor R2 and diode 10 in the forward direction with the switch S open. Thereafter the switch S can be closed to apply a reverse potential across diode 10. FIGURES 1(*b*) and (*c*) respectively illustrate the voltage drop across and current through the diode 10. Let it be assumed that the switch S is closed at time T0. Prior to time T0, the voltage across the diode 10 is equal to the forward voltage drop $V_f$ across a conducting diode and the current through the diode is equal to $I_f$. At time T0, a reverse current equal to $(V/R1-I_f)$ is driven through the diode 10. After an inductive transient occurs at 12, the voltage across the diode will be positive and very small but a fairly high reverse current can be maintained through the diode because of the stored minority carriers. When the stored minority carriers become depleted, diode conduction will cease and as can be seen, a fairly large back-biasing potential $(V-I_fR1)$ will exist across the diode 10. The preferred embodiment of the invention illustrated in FIGURE 2 makes use of the forward and reverse conduction through the diode 10 for the purpose of respectively conducting read and write currents through word lines of a word organized memory.

Attention is now called to FIGURE 2 which illustrates a magnetic core array 16 and a word drive system adapted to be used therewith for driving read and write currents through the array 16 in order to enable information to be entered into and accessed from the magnetic core memory array. The array 16 includes a plurality of memory locations (herein, four). The locations are respectively identified as locations A, B, C, D, and each includes a plurality of magnetic cores 18 (herein, five). A different word line 20 threads all of the magnetic cores 18 in each of the memory locations. A different sense line 22 is threaded through all of the cores correspondingly positioned in the different memory locations. Each of the sense lines 22 is coupled to a corresponding stage of a memory register 24.

In the normal utilization of a word organized memory, information is accessed from a particular location, e.g. location A by directing a current in the word line A in a direction tending to orient all of the cores in location A to a first state. Of course, those cores which switch as a result of the current in word line A previously defined a second state while those cores which do not switch defined a first state. As is well known in the art, switching cores can be detected inasmuch as they will induce a signal in the sense line 22 threaded therethrough. Thus, the information stored in the cores of memory location A can be read into the register 24. In order to write information into memory location A, a reverse current can be directed through word line A tending to force the cores to a second state. Depending upon the information stored in register 24, the switching of certain cores to a second state will be inhibited by signals provided on sense lines 22.

In most prior art word organized memories, the oppositely directed word line currents are conducted through separate word lines inasmuch as diodes must usually be included in each word line in order to prevent current leakage from the word line of one location to the word line of another location. In order to reduce memory fabrication costs, it has been suggested that a single word line can be used for each memory location if a charge storage diode 26, rather than a conventional diode, is connected in series with the single word line. As previously pointed out, the aforecited reference discusses such a memory but due to its many disadvantages, it has not been widely used.

The four memory locations in the array 16 of FIGURE 2 are connected in a 2 x 2 matrix for selection purposes. Thus, the left or charge storage anode sides of word lines A and C are connected to a first read sink switch RS0 while the left sides of word lines B and D are connected to a second read sink switch RS1.

The right or charge storage diode cathode sides of word lines A and B are connected to a first read driver switch RD0 while the right sides of word lines C and D are connected to a second read driver switch RD1. Both read driver switches are connected to a read pulse current source RCS.

In order to access information from a particular memory location, both the read sink switch and read driver switch associated with that location are closed to thereby permit a read pulse provided by the read pulse current source RCS to be directed through the word line in a forward direction through the charge storage diode 26. A write current can then be directed through the charge storage diode 26 initially conducting the read current by closing the write sink switch WS connected to the right sides of all of the word lines so as to permit the write pulse current source WCS connected to the left sides of the word lines to drive a write pulse through the selected word line.

Each read sink switch includes a switching transistor 30 of the PNP type. The emitter of transistor 30 is connected to a reference potential e.g. 0 volts and the collector thereof is connected through a resistor 32 to a source of negative potential, e.g. −14 volts. The base of each of the read sink transistors is connected through a resistor 34 to a source of negative potential, e.g. −12 volts. The base of each of the read sink transistors is additionally connected through a diode 36 to the output terminal of a decoding circuit 38 responsive to information stored in a memory address register 40. Thus, in order to access information from location A in the memory array 16, the read sink switch RS0 must be forward biased while all of the other read sink switches are off-biased. Thus, the information in the address register 40 identifying location A causes the decoding circuit 38 to apply a positive potential to the anodes of all of the diodes 36 except the diode connected to the base of the transistor in the read sink switch RS0.

A second decoding circuit 42 is also connected to the output of register 40 and responsive to further information therein for selecting one of the read driver switches. Thus, still assuming that location A in memory array 16 is to be selected, the read driver switch RD0 including NPN transistor 44 must be forward biased. Each of the output terminals of decoding circuit 42 is connected to the base of a different one of the read driver switching transistors 44. The collector of read driver switch RD0 is connected to the right sides of word lines A and B. Thus, as a consequence of the information stored in register 40, read sink switch RS0 and read driver switch RD0 can both be forward biased so as to thereby define a unique current path through word line A. Included in the current path is the read pulse current source RCS which includes a pair of serially connected transistors 46 and 48 which are respectively of the NPN and PNP type. The emitters of all of the read driver switches are connected to the collector of transistor 46 whose emitter is connected through resistor 50 to the emitter of transistor 48. The collector of transistor 48 is connected to a source of negative potential, e.g. —20 volts. The base of transistor 46 is connected to a source of negative reference potential, e.g. —12 volts. The base of transistor 48 is connected to one output terminal of timing means 52. Connected between the collectors of transistors 46 and 48 is a parallel circuit including resistor 54 and capacitor 56.

The write current circuit as noted includes the write sink switch WS and the write pulse current source WCS. The write sink switch includes PNP transistor 60 whose emitter is connected to a source of reference potential e.g. 0 volt. The base of transistor 60 is connected through a resistor 62 to a source of negative potential e.g. —12 volts. Similarly, the collector of transistor 60 is connected through a resistor 64 to the —12 volt source of negative potential. The base of transistor 60 is additionally connected through a diode 66 to one terminal of the timing means 52. The collector of transistor 60 is additionally connected through diode 68 to the right sides of word lines A and B and through diode 70 to the right sides of word lines C and D. The cathodes of diodes 68 and 70 are respectively connected through biasing resistors 72 and 73 to a source of positive potential, e.g. +2 volts.

The left sides of word lines A and C are connected to the anode of diode 74. Similarly, the left sides of word lines B and D are connected to the anode of diode 76. The cathodes of diodes 74 and 76 are both connected to the write pulse current source WCS which includes serially connected transistors 78 and 80. More particularly, the cathodes of diodes 74 and 76 are connected to the collector of NPN transistor 78 whose base is connected to a source of negative potential, e.g. —12 volts. The emitter of transistor 78 is connected through a resistor 82 to the emitter of transistor 80 whose base is connected to one terminal of the timing means 52. The collector of transistor 80 is connected to a source of negative reference potential e.g. —20 volts.

The timing means 52 is provided with four output terminals respectively identified as T1, T2, T3, and T4. The timing means 52 successively provides enabling signals on each of these output terminals for appropriately initiating currents in the memory system apparatus of FIGURE 2. Thus, the timing means 52 initially provides a signal on terminal T1, connected to the decoding circuits 38 and 42, which closes the selected read sink and read driver switches. The signal subsequently provided on terminal T2, connected to the base of transistor 48 of the read pulse current source, initiates a read current through the selected word line. The signal subsequently provided on terminal T3, connected to the base of transistor 60, closes the write sink switch. When the timing signal is provided on terminal T3, the selected read sink and read driver switches are opened and the read current provided by the read pulse current source is teminated. The signal subsequently provided on terminal T4, connected to the write current source, initiates a write current after the write sink switch is closed.

It is pointed out that the timing means 52 illustrated herein is provided only for the purpose of relating in time the occurrence of various actions in the operation of the apparatus of FIGURE 2, and should not be understood as necessarily representing the timing clock normally provided in data processing equipment in which the disclosed memory system can be employed.

In the operation of the memory system of FIGURE 2, prior to the initiation of a memory cycle, both read sink switches, both read driver switches, and the write sink switch are cut off. In addition, the read and write current pulse sources generate no current. The charge storage diode anodes are held at —14 volts and the charge storage diode cathodes are held at +2 volts so that the charge storage diodes have a reverse bias of 16 volts. All of the other conventional diodes are also back-biased.

In any large discrete element memory, there are large distributed capacitances between word line and ground, word line and word line, and word line and sense lines. Before any current can be made to flow in a selected word line, it is necessary that the capacitance of the selected sink bus, i.e. either bus 84 or 86, be charged (herein toward 0 volt). As soon in a memory cycle as the address register is stabilized, the base of the selected read sink switch is driven negative. This causes the collector current of the selected read sink switch to charge the capacitance of the sink bus connected thereto toward 0 volt. At the same time as the base of the selected read sink switch is driven negative, the base of the selected read driver switch is driven positive with respect to —12 volts. This causes a small electron current to flow from the read prime current source comprised of resistor 54 and capacitor 56 to the emitter of the selected read driver switch. The read driver collector current charges the capacitance of the selected driver bus, i.e. either bus 88 or bus 90 toward —12 volts. This capacitance is due mainly to the capacitance of many back-biased charge storage diodes. When the increasing potential on the selected sink bus becomes more positive than the decreasing potential on the selected driver bus, part of the collector current through the selected read driver switch will be diverted through the selected word line. This priming current reduces the forward voltage transient across the selected charge storage diode which occurs later when the read current pulse is applied by the read pulse current source RCS. The selected read driver is thereby prevented from saturating and the leading edge of the read current pulse through the selected word line is made independent of the word selected. All charge storage diodes other than the selected one of course remain back-biased. Even before the read sink switch bus has reached 0 volt, the read pulse current source can be turned on by the timing means 52 with a precise negative voltage pulse at the base of transistor 48. As a result, a precise electron current pulse enters the bus 92 coupling the read driver switches to the read pulse current source. This electron current pulse will flow almost entirely through the selected read driver switch. The resistor 72 and 73 will divert little current because of their large resistances. These resistors must discharge the selected read driver bus at the end of a memory cycle but they need not carry the write current pulse as in other memory drive systems.

As read current enters the selected word line (assumed to be word line A), the potential on bus 88 dips negative with respect to bus 84. The voltage difference is the sum of the signal voltages from all cores on word line A, the inductive voltage drop in the word line, and the voltage drop across the charge storage diode. Voltage levels and timing of pulses are preferably selected so that bus 88 is always more positive than the base of transistor 44. Therefore, the selected charge storage diode in word line A remains the only one that is forward biased during the read portion of the memory cycle.

The read current will be independent of the information stored in the cores ont he selected word line if the driving circuit has a high source impedance. Power dissipation is kept to a minimum required to drive the read current through the selected word line without saturating the read driver switch. Inasmuch as the read current pulse does not represent the difference between two larger currents, as is typical in prior art systems, read current is controlled better, power dissipation is lower, and the selected read sink switch and read driver switch currents are lower.

At the end of the read current pulse, the selected read sink and read driver switches are cut off and the write sink switch is enabled by driving its base more negative than ground. Shortly thereafter, the write current pulse source is caused to supply a controlled current by driving the base of transistor 80 more negative than −12 volts. The timing of the trailing edge of the signal applied to the base of the read sink switch RS0, the trailing edge of the signal applied to the base of the read driver switch RD0, and the leading edge of the signal applied to the base of the write sink switch WS are not critical. There is no danger of a low impedance path being set up if a malfunction of timing occurs because all saturating switches are connected to 0 volt and their currents are limited by high impedance current sources.

With the write sink switch closed and the write current pulse source generating a controlled current, current flows in the reverse direction through the previously selected, i.e. word line A charge storage diode. Bus 88 is held at about −1 volt through the saturation voltage of the write sink switch in series with diode 68. Bus 84 is negative with respect to bus 88 by the sum of signal voltages of all cores in the word line, the word line inductive drop, minus the drop across the charge storage diode. In general, this voltage difference is less than during the read portion of the cycle because write current is usually less than read current and the charge storage diode subtracts from the other voltage drops rather than adding to them. The write drive diode 74 is forward biased and the potential at the anode thereof is more positive than −12 volts. The diodes 70 and 76 are reverse biased as are all the unselected charge storage diodes. Therefore, the write current set up by the write current pulse source flows entirely through word line A, with the exception of a current to the capacitance of bus 84 and the discharge resistor 32. In a large system, this charging current may be specifically provided for by the write current source so as to keep the write current through the selected word line constant. Resistor 32 can have a high value because it need only hold the potential of bus 84 at −14 volts between memory cycles.

The selected charge storage diode conducts in the reverse direction until all its stored charge is dissipated by the write current pulse and by minority carrier recombination. A short time before the end of the write current pulse, this charge is completely dissipated and the impedance of the charge storage diode suddenly becomes high. The write current pulse source then drives bus 84 toward −12 volts. Thus, by the end of the write current pulse, all busses are charged to nearly the potentials required at the start of the memory cycle. With the write current pulse source and the write sink switch disabled, bus 84 charges toward −14 volts and bus 88 toward +2 volts.

As in the read portion of the cycle, during the write portion of the cycle, good control is exercised over the write current because it is very nearly equal to the output of the write current pulse source. Likewise, a relatively small current is carried by the switches and drivers and only a small amount of power is dissipated. It is also to be noted that the disclosed system requires only one write sink switch in conjunction with M write drive diodes, e.g. diode 74, and N write sink diodes, e.g. diode 68, for a system including MN memory locations. It is also to be noted that the address information held in register 40 is required only during the read portion of the memory cycle.

From the foregoing, it should be appreciated that an improved word drive system for word organized memories has been disclosed herein which permits oppositely directed read and write currents to be driven through a single word line associated with each memory word location. By providing a charge storage diode in each of the memory word lines and by connecting thereto a read current pulse source and a write current pulse source and appropriate switches, controlled read and write currents can be driven in opposite directions through a selected word line. It should of course be appreciated, but is however pointed out for emphasis, that the preferred embodiment of the invention illustrated in FIGURE 2 is exemplary in nature and the invention should not be interpreted as being limited thereto. Thus, the specific manner in which control is exercised over the switches and drivers shown therein is arbitrary as are the exemplary voltage levels mentioned, etc.

What is claimed is:

1. In a digital memory system wherein an array of discrete memory elements are arranged in rows, with each different row of elements having a different word line coupled there to, and drive means for successively driving oppositely directed currents through each of said word lines, the combination with, a different charge storage diode connected in series with each of said word lines; first circuit means directly connected to each of said word lines back biasing the charge storage diode connected in series therewith; a plurality of read sink switches; a plurality of read driver switches; connecting means connecting each of said word lines and charge storage diode in series therewith between a different pair of read sink and read driver switches for driving a current in a forward direction through said charge storage diodes; a write sink switch; means connecting each of said word lines in series withe the said write sink switch; third circuit means connected in series with said write sink switch for driving a current in a reverse direction through said charge storage diodes; means for initially simultaneously closing a selected read sink switch and a selected read driver switch; and means for subsequently opening said selected read sink and read driver switches and for closing said write sink switch.

2. The memory system of claim 1 including means for activating said second circuit means after the beginning of but during the interval in which said selected read sink and driver switches are close; and means for activating said third circuit means after the beginning of but during the interval in which said write sink switch is closed.

3. The memory system of claim 1 wherein said first circuit means includes first impedance circuit elements connecting the cathodes of each of said charge storage diodes to a relatively positive reference potential source and second impedance circuit elements connecting the anodes of each of said charge storage diodes to a relatively negative reference potential source; said first and second impedance circuit elements being of a relatively high value whereby substantially no current will be diverted therethrough.

4. The memory system of claim 1 wherein each of said read sink switches comprises a transistor having an input terminal, an output terminal and a control terminal; means connecting each of said read sink switch transistor output terminals to a different sink bus; and wherein each of said read driver switches comprises a transistor having an input terminal, an output terminal and a control terminal; means connecting each of said read driver switch transistor input terminals to a different driver bus; and wherein said connecting means includes means connecting each of said word lines and charge storage diode in series therewith between a different pair of sink and driver busses.

5. The memory system of claim 4 wherein said write sink switch comprises a transistor having an input terminal, an output terminal, and a control terminal; a different diode means connecting said write sink switch transistor output terminal to each of said driver busses; and a different diode means connecting said third circuit means to each of said sink busses.

6. The memory system of claim 4 wherein said first circuit means includes first impedance circuit elements connecting each sink bus to a relatively positive reference potential source and second impedance circuit elements connecting each driver bus to a relatively negative reference potential source; said first and second impedance circuit elements being of a relatively high value whereby substantially no current will be diverted therethrough.

7. The memory system of claim 1 including a priming current source connected in parallel with said third circuit means.

References Cited

UNITED STATES PATENTS

| | | | |
|---|---|---|---|
| 3,356,998 | 12/1967 | Kaufman | 340—173 |
| 3,296,598 | 1/1967 | Meier et al. | 307—88.5 |
| 3,175,203 | 3/1965 | Bice | 340—174 |

JAMES W. MOFFITT, Primary Examiner

U.S. Cl. X.R.

307—319